UNITED STATES PATENT OFFICE.

JAMES FERGUSON, OF BRIDGEWATER, MASSACHUSETTS, ASSIGNOR TO BRIDGEWATER IRON COMPANY, OF SAME PLACE.

IMPROVEMENT IN COMPOSITIONS FOR COVERING METALLIC SURFACES.

Specification forming part of Letters Patent No. 171,004, dated December 14, 1875; application filed November 16, 1875.

*To all whom it may concern:*

Be it known that I, JAMES FERGUSON, of Bridgewater, in the county of Plymouth and State of Massachusetts, have invented a new and useful composition to prevent metallic surfaces from adhering or welding together while subjected to heat and pressure; and I do hereby declare the same to be described as follows:

The said composition is composed of pulverized graphite and a solution of chloride of sodium; the proportions of the ingredients which I have found to answer well in practice being one gallon of water, one-half a pound of chloride of sodium, and one-quarter of a pound of graphite. After the graphite and the chloride have been put into the water the whole should be thoroughly stirred, which having been accomplished, so as to cause the water to dissolve the chloride, the mixture will be complete. To use it, it is to be painted or spread with a brush over the surfaces to be protected.

The particular application I have made of it in the arts is to the bores of tubular metallic ingots, such as, by means of rollers, are drawn in a heated state into flat blanks, to be subsequently spread open into the forms of cylindrical tubes. The composition effectually prevents adhesion of the inner surfaces of the blanks under the action of the great heat and the reducing-rollers.

The graphite, being infusible, resists the action of the heat. The chloride not only operates to keep the graphite in suspension in the solution, but to bind it to the metal, and prevent it from scaling therefrom or separating while being extended therewith by the rollers. The graphite, to operate to the best advantage, generally should, on being applied to the solution of the chloride, be in the state of an impalpable powder.

I do not confine my invention to the precise proportions of the ingredients as above described, as such may be varied somewhat without materially affecting the efficiency of the compound.

I claim—

For preventing the adhering of heated metallic surfaces, the composition consisting of graphite, chloride of sodium, and water, substantially as above described.

JAMES FERGUSON.

Witnesses:
R. H. EDDY,
J. R. SNOW.